Figure 1:
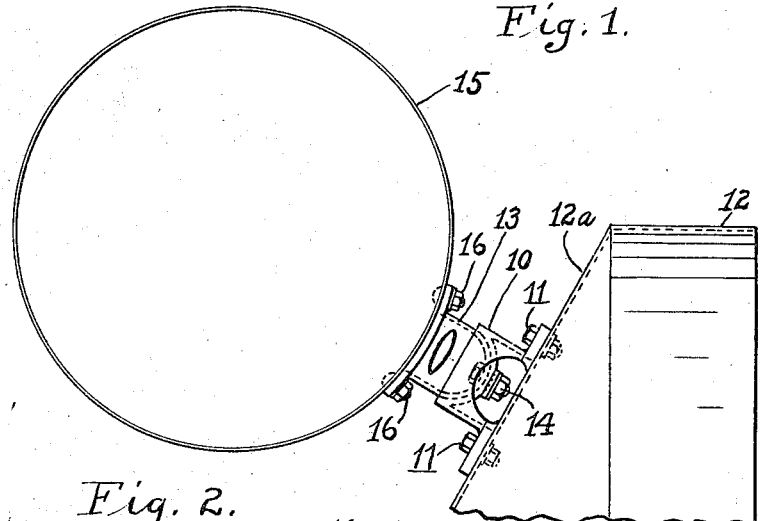

Nov. 11, 1924.                                                                                   1,514,867
A. SOLOSABAL ET AL
HEADLIGHT SUPPORTING BRACKET
Filed July 20, 1922

INVENTORS
ANDRES SOLOSABAL
LLOYD G. RIPPEY

BY Albert E. Bell
ATTY.

Patented Nov. 11, 1924.

1,514,867

UNITED STATES PATENT OFFICE.

ANDRES SOLOSABAL, OF BOISE, IDAHO, AND LLOYD G. RIPPEY, OF LOS ANGELES, CALIFORNIA.

HEADLIGHT SUPPORTING BRACKET.

Application filed July 20, 1922. Serial No. 576,200.

*To all whom it may concern:*

Be it known that we, ANDRES SOLOSABAL and LLOYD G. RIPPEY, citizens of the United States, residing at Boise, in the county of Ada and State of Idaho, and Los Angeles, in the county of Los Angeles and State of California, respectively, have invented a new and useful Improvement in Headlight-Supporting Brackets, of which the following is a specification.

Our invention relates to an improved construction of bracket for supporting a headlight for motor vehicles from a fender commonly employed on said vehicles and is characterized by the provision of adjusting devices for accurately placing the headlight in a desired position and rigidly holding the headlight in said position in a manner that will more fully appear below.

As referred to, our invention is for the purpose of mounting headlights from the fenders of motor vehicles and in doing this, it is necessary to use the supporting brackets with different constructions and different shapes of fenders with different vehicles; for example, the inner side wall of the fender, to which our bracket is adapted to be secured, in some cases has one vertical inclination and in other cases other inclinations, and in some cases the said inner walls of the fenders have one longitudinal inclination and in other cases other longitudinal inclinations relatively to the vehicle. We are aware that brackets for the purpose described have been proposed in the past consisting of two members pivotally connected together; while this construction affords a proper adjustment for various inclinations of the fender in one direction mentioned, it affords no means for properly mounting the headlight for various inclinations for the other direction mentioned. By our invention we provide a supporting bracket consisting of a base member and a second member movably supported thereon, the members being so related as to have in effect a universal joint connecting them by which the second member, which is secured to the headlight, may be turned or rocked on the base member in any direction necessary to give the headlight the desired location and direction, thus permitting the use of our supporting bracket on any type and shape of fender. More specifically, the members of our bracket are provided with a hemispherical seat and a cooperating hemispherical head carried respectively by the members, the head fitting the seat to move therein, and a clamping screw or equivalent device for securing the members together in desired adjustments, the seat being preferably formed in the base member. In this manner our supporting bracket is adapted to be applied to any type of fender in use and readily facilitate the adjustment of the headlight to a desired position and direction.

Our invention will best be understood by reference to the accompanying drawings showing a preferred embodiment thereof in which Fig. 1 shows in front elevation a headlight and fender in outline connected by our improved bracket.

Figure 2:
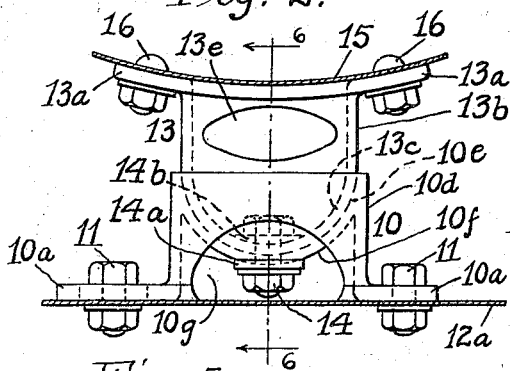
Figure 3:
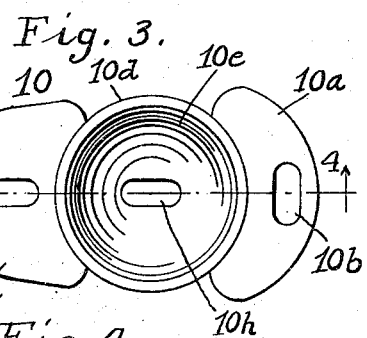
Figure 5:
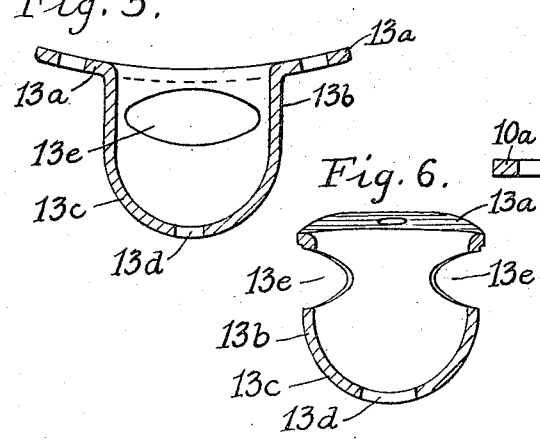
Figure 6:
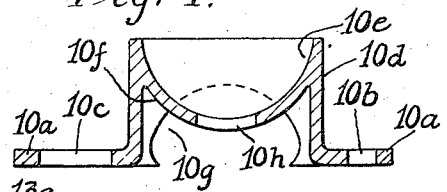

Fig. 2 shows in a view similar to Fig. 1 to an enlarged scale, the bracket itself, Fig. 3 is a plan view of the base member of the bracket, Fig. 4 is a longitudinal sectional view of the base member shown in Fig. 3 taken along the line 4—4, Fig. 5 is a view similar to Fig. 4 of the second member of the bracket, and Fig. 6 is a sectional view of the second member of the bracket taken along the line 6—6 in Fig. 2.

Similar numerals refer to similar parts throughout the several views.

As shown in Fig. 1 our improved construction consists of a base member 10 of the supporting bracket rigidly secured by bolts or screws 11, 11 to the inner wall 12$^a$ of a fender 12. The base member 10 of the bracket supports a second member 13 by means of a ball and socket connection, described below, said members being secured together by a clamping bolt or screw 14. The second member 13 is rigidly secured to the casing of a headlight shown diagrammatically at 15, by suitable bolts or screws 16, 16.

As shown in Figs. 2, 3 and 4, the base member 10 consists of a base plate 10$^a$ provided with end slots 10$^b$ and 10$^c$ for receiving the bolts or screws 11, 11 and from the central portion of the base 10$^a$ a cylindrical extension 10$^d$ projects, in the outer end of which a hemispherical seat 10$^e$ is formed. The walls of the cylindrical extension and of the hemispherical seat are only of such a thickness as required to support the headlight, thus leaving ample room within the extension 10$^d$ for the nut of the clamping bolt 14. The outer surface of the wall of the seat is preferably spherical in conformation as indicated at 10$^f$ and to fit this surface a special washer 14$^a$ is employed having a concave upper surface as indicated in Fig. 2, to fit the surface 10$^f$ of the seat so that the nut of the clamping bolt 14 may have a proper support through said special washer from the surface 10$^f$. The sides of the wall of the extension 10$^d$ are cut away as indicated at 10$^g$ to afford ready access to the nut of the clamping bolt 14 for purposes of adjustment. The central portion of the seat 10$^e$ has formed through its wall, a slot 10$^h$ permitting motion of the bolt 14 longitudinally of the base member 10 when the nut of the clamping bolt 14 is released. The slot 10$^b$ preferably extends transversely of the base 10$^a$ and the slot 10$^c$ preferably extends longitudinally of said base to facilitate securing the base member to the fender in desired position and adjustment.

As indicated in Figs. 2, 5 and 6, the second member 13 of the bracket consists of a base 13$^a$ of a curvature to fit the outer surface of the casing of the headlight 15, through the ends of which suitable openings are provided for the bolts or screws 16, and from the central portion of said base a cylindrical extension 13$^b$ projects, which at its outer end is extended into a hemispherical head 13$^c$ fitting the hemispherical seat 10$^e$ of the base member 10. The wall of the cylindrical extension 13$^b$ and of the hemispherical head 13$^c$ is only of such a thickness as required to support the weight of the headlight and thus a clearance is left within the said extension and head to receive the head of the clamping bolt 14. The inner surface of the hemispherical head 13$^c$ is preferably hemispherical and to afford a flat seat for the head of the bolt 14 a special washer 14$^b$ is provided under said head, the lower face of said washer as indicated in Fig. 2 being convex to fit the inner surface of the head 13$^c$. The central portion of the head 13$^c$ is preferably provided with a slot 13$^d$ extending transversely of the bracket to permit the passage of the clamping bolt 14 therethrough, and through the side walls of the cylindrical extension 13$^b$, clearance openings 13$^e$ are formed to permit the insertion of the clamping bolt 14 and the handling of the same as may be required in assembling the bracket, securing any desired adjustment with it and finally clamping the parts of the brackets together in any desired adjustment as may be necessary.

The members of the bracket are constructed preferably of metal and may be formed by casting or stamping as desired.

As a result of the construction described it will appear that when the nut of the clamping bolt 14 is released, the member 13 may be rocked in the member 10 in any desired direction and that the extent of possible motion is determined by the distance that the center of the spherical surfaces of the member 10 is outside of its outer end. In this manner we secure the effect of a universal joint between the members of the bracket by means of a compact construction and further, the member 13 is rigidly supported in any desired position as a result of the large areas of bearing surfaces between the members of the bracket for any adjustment, and furthermore, any desired adjustment may be accurately made since the co-operating surfaces of the members of the bracket are smooth and no ridges or co-operating grooves are necessary to securely hold the parts of the bracket together.

While we have shown our invention in the particular embodiments above described, it will be understood that we do not limit ourselves to this exact construction as we may employ aquivalents known to the art at the time of the filing of this application without departing from the scope of the appended claims.

What we claim is:

1. As a means for mounting lamps on vehicle fenders, the combination of a convex cup member, a concave cup member, each of said members having a cylindrical tubular extension from its cup portion provided with attaching lugs, and each of said members having a side opening and bottom opening through its cup portion, and a bolt connection through said bottom openings securing the cup portions of said members together, said bottom openings clearing said bolt connection to permit rocking movement of said members relatively to each other for adjustment purposes, and said side openings permitting manipulation of said bolt connection.

2. As a means for mounting lamps on vehicle fenders, the combination of a convex cup member, a concave cup member, each of said members having a cylindrical tubular extension from its cup portion provided with attaching lugs, and each of said members having a side opening and bottom opening through its cup portion, and a bolt connection through said bottom openings securing the cup portions of said members together, said bottom openings clearing said bolt connection to permit rocking movement of said members relatively to each other for adjustment purposes, and said side openings permitting manipulation of said bolt connection, the lugs on one of said members having slotted openings therethrough for securing it to a fender and permitting adjustment of said member thereon.

3. As a means for mounting lamps on vehicle fenders, the combination of a convex cup member, a concave cup member, each of said members having a cylindrical tubular extension from its cup portion provided with attaching lugs, one of said members having a side opening and a bottom opening through its cup portion slotted in one direction and the other of said members having a side opening and a bottom opening through its cup portion slotted in a second direction, and a bolt connection through said bottom openings securing the cup portions of said members together, said bottom openings clearing said bolt connection to permit rocking movement of said members relatively to each other for adjustment purposes, and said side openings permitting manipulation of said bolt connection.

4. As a means for mounting lamps on vehicle fenders, the combination of a convex cup member, a concave cup member, each of said members having a cylindrical tubular extension from its cup portion provided with attaching lugs, one of said members having a side opening and a bottom opening through its cup portion slotted in one direction and the other of said members having a side opening and a bottom opening through its cup portion slotted in a second direction, and a bolt connection through said bottom openings securing the cup portions of said members together, said bottom openings clearing said bolt connection to permit rocking movement of said members relatively to each other for adjustment purposes, and said side openings permitting manipulation of said bolt connection, the lugs on one of said members having slotted openings therethrough for securing it to a fender and permitting adjustment of said member thereon.

In witness whereof, we hereunto subscribe our names this 11th day of July, A. D. 1922.

ANDRES SOLOSABAL.
LLOYD G. RIPPEY.